（12） United States Patent
Li et al.

(10) Patent No.: US 11,029,978 B2
(45) Date of Patent: Jun. 8, 2021

(54) INDUSTRIAL CONTROLLER AND METHOD FOR AUTOMATICALLY CREATING USER INTERFACE

(71) Applicant: Siemens Aktiengesellschaft, Munich (DE)

(72) Inventors: Yang Li, Beijing (CN); Shun Jie Fan, Beijing (CN); Ming Jie, Beijing (CN); Qi Sun, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 119 days.

(21) Appl. No.: 16/336,180

(22) PCT Filed: Sep. 27, 2016

(86) PCT No.: PCT/CN2016/100339
§ 371 (c)(1),
(2) Date: Mar. 25, 2019

(87) PCT Pub. No.: WO2018/058304
PCT Pub. Date: Apr. 5, 2018

(65) Prior Publication Data
US 2019/0278617 A1 Sep. 12, 2019

(51) Int. Cl.
*G06F 9/451* (2018.01)
*G05B 19/418* (2006.01)
(Continued)

(52) U.S. Cl.
CPC ......... *G06F 9/452* (2018.02); *G05B 19/4188* (2013.01); *G05B 19/41835* (2013.01);
(Continued)

(58) Field of Classification Search
CPC .......... G05B 19/41835; G05B 19/4188; G06F 3/04847; G06F 8/38; G06F 9/44;
(Continued)

(56) References Cited

U.S. PATENT DOCUMENTS 7,392,100 B1 6/2008 Thomas et al.
2003/0025737 A1 2/2003 Breinberg
(Continued)

FOREIGN PATENT DOCUMENTS

CN 101251800 A 8/2008
CN 101859245 A 10/2010
(Continued)

OTHER PUBLICATIONS

Extended European Search Report dated Mar. 31, 2020.
(Continued)

*Primary Examiner* — Chun Cao
(74) *Attorney, Agent, or Firm* — Harness, Dickey & Pierce, P.L.C.

(57) ABSTRACT

An industrial controller for automatically creating user interfaces, is configured to collect information generated when an industrial system submodule is operating, extract operation parameters of interest from the information generated when the industrial system submodule is operating, and create a user interface to reproduce the operation parameters of interest according to the extracted operation parameters of interest. The industrial controller can also re-create a user interface according to a parameter update input or a custom configuration input of a user. The industrial controller can automatically create a user interface without the need to manually parse the parameters, thereby realizing flexible interface settings. A user interface can be created in a web-based mode so that user access is not limited by locations and is flexible and convenient.

22 Claims, 7 Drawing Sheets

(51) Int. Cl.
  *G06F 8/38* (2018.01)
  *G06F 9/54* (2006.01)
  *G06F 9/44* (2018.01)

(52) U.S. Cl.
  CPC .................. *G06F 8/38* (2013.01); *G06F 9/44* (2013.01); *G06F 9/547* (2013.01)

(58) Field of Classification Search
  CPC ...... G06F 9/44505; G06F 9/451; G06F 9/452; G06F 9/547
  See application file for complete search history.

(56) References Cited

U.S. PATENT DOCUMENTS

| | | | | |
|---|---|---|---|---|
| 2006/0288301 | A1* | 12/2006 | Hood | G06F 3/0484 |
| | | | | 715/762 |
| 2011/0093800 | A1 | 4/2011 | Gottwald et al. | |
| 2012/0029661 | A1 | 2/2012 | Jones et al. | |
| 2013/0254686 | A1* | 9/2013 | Sun | G06F 3/0481 |
| | | | | 715/762 |
| 2015/0186119 | A1 | 7/2015 | Chouinard et al. | |
| 2015/0341184 | A1* | 11/2015 | Tatzel | H04L 12/28 |
| | | | | 700/275 |

FOREIGN PATENT DOCUMENTS

| | | |
|---|---|---|
| CN | 104484169 A | 4/2015 |
| CN | 104731589 A | 6/2015 |

OTHER PUBLICATIONS

Notification of Transmittal of International Search Report and the Written Opinion of the International Searching Authority (Form PCT/ISA/220) for PCT International Application No. PCT/CN2016/100339 which has an International Filing Date of Sep. 27, 2016.

International Search Report (Form PCT/ISA/210) for PCT International Application No. PCT/CN2016/100339 which has an International Filing Date of Sep. 27, 2016.

Written Opinion of the International Searching Authority (Form PCT/SIA/237) for PCT International Application No. PCT/CN2016/100339 which has an International Filing Date of Sep. 27, 2016.

\* cited by examiner

INDUSTRIAL CONTROLLER AND METHOD FOR AUTOMATICALLY CREATING USER INTERFACE

PRIORITY STATEMENT

This application is the national phase under 35 U.S.C. § 371 of PCT International Application No. PCT/CN2016/100339 which has an International filing date of Sep. 27, 2016, which designated the United States of America, the entire contents of which are hereby incorporated herein by reference.

FIELD

Embodiments of the present invention generally relate to an industrial controller for automatically creating a user interface in an industrial system and a method for automatically creating a user interface.

BACKGROUND

An industrial system refers to a system formed by one or more operating devices and its or their controllers in an industrial plant environment. An operating device in an industrial system generally has a user interface. The user interface may be a Human Machine Interface (HMI) used to execute a human-computer interaction, for example, receive a configuration parameter and a control command input by a user for an operating device and provide a user with operating status of the operating device in the system so that the user can monitor and control the operation of the device.

In the prior art, programmers need to program user interfaces of operating devices for different industrial systems to create user interfaces for monitoring and controlling operating devices. The work needs to be done by a professional programmer by consulting technical manuals of operating devices, determining data that can be provided by the operating devices, how to acquire the data and how to control the devices, and programming the devices. The work of programming user interfaces of operating devices is not only complex but also requires debugging the programs. When a device is added, an old device is replaced, or an existing device is upgraded in a system, a professional programmer is needed to program the user interfaces of operating devices or modify the existing programs and debug the programs.

In addition, centralized user interface compilation and configuration are mostly adopted in the prior art, that is, a centralized central site is used to compile and configure user interfaces of different operating devices. If the user interface of any one operating device in an industrial system needs to be reconfigured and modified, the work has to be done through the central compilation station. This mode is inflexible. Therefore, in a traditional industrial automation system, there are high professional requirements for the creation of user interfaces for operating devices, the workload is large, and the work is inflexible.

Figure 1:
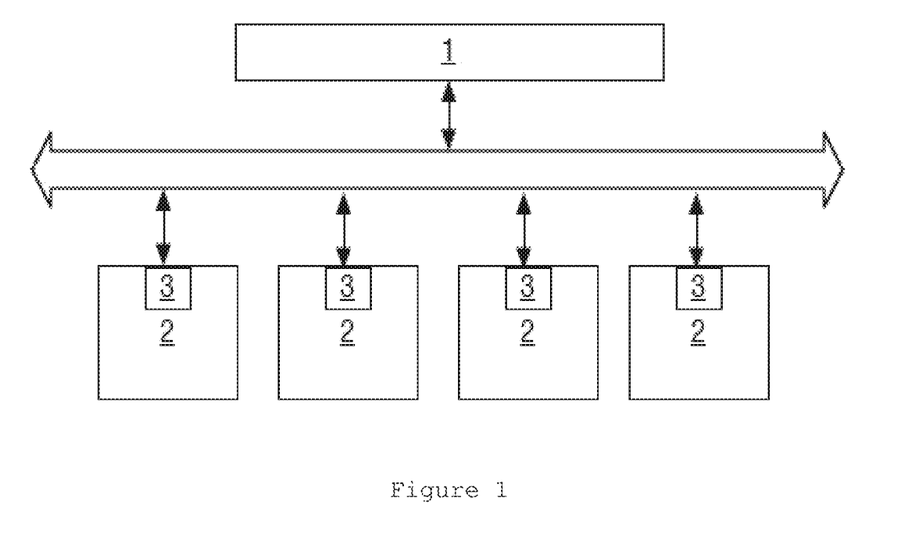
FIG. 1 schematically shows an apparatus for creating a user interface in an existing industrial system.

FIG. 1 shows an apparatus for creating a user interface in an industrial system according to the prior art. The industrial system includes one or more operating devices 2 and an industrial controller 3 that controls the operating device 2. A central site 1 is set in the industrial system. The operating device 2 and the industrial controller 3 that controls the operating device 2 can be connected to the central site 1 through an industrial Ethernet or another communication mode. The user interface of the operating device 2 is created by the central site 1 through configuration and is sent to the operating device 2 or the industrial controller 3 that controls the operating device 2.

At present, some software for creating a user interface is developed. However, users have to purchase and install the software on clients. The software can run on one software platform and a dedicated configuration and development environment is required. When a device is added, an old device is replaced, or an existing device is upgraded in an industrial system, software and hardware of the whole industrial system need to be maintained. Software installation and maintenance costs are high. In addition, a layout of a created user interface is fixed and personalized settings and custom adjustments are not supported for users. To better meet personalized requirements of users and enable users to operate with a friendly interface, users must be allowed to define the operation interface so that the interface is more personalized and is close to the users.

SUMMARY

An embodiment of the present invention discloses an industrial controller for automatically creating a user interface. The industrial controller is set in an industrial system submodule and the industrial system submodule includes a processing part, configured to collect information generated when an industrial system submodule is operating, a processing part, configured to extract an operation parameter of interest from the information generated when the industrial system submodule is operating and create a user interface for reproducing the operation parameter of interest according to the operation parameter of interest, and a communication part, configured to send the user interface to a user terminal, receive an information input from the user terminal and send the information input to the processing part.

An embodiment of the present invention further discloses a method for creating a user interface. The method includes acquiring, by an industrial controller integrated in an industrial system submodule, information generated when the industrial system submodule is operating, where the industrial controller is used to control operation of the industrial system submodule, extracting an operation parameter of interest from the information generated when the industrial system submodule is operating, and creating a user interface for reproducing the operation parameter of interest according to the operation parameter of interest.

An embodiment of the present invention further discloses a non-transient machine readable medium. The machine readable medium is used to store a machine readable instruction used to generate a user interface and, when the machine readable instruction is executed by an industrial controller, the industrial controller executes and implements the function of any one of the embodiments.

BRIEF DESCRIPTION OF THE DRAWINGS

The following further describes the features, technical features, advantages and implementation modes of the present invention by using example embodiments and referring to the accompanying drawings.

DESCRIPTION OF SYMBOL NUMBERS IN THE FIGURES

1: central site that is used to create a user interface in a centralized way
2: operating device
3: industrial controller
10: industrial controller
20: operating device
102: collecting part
104: processing part
106: communication part
108: storage part
200: user interface
500: front-end display of a user interface
501: front-end graphical control display area of a user interface
502: front-end text display area of a user interface
503: front-end parameter display area of a user interface
504: front-end custom configuration control of a user interface
601: user interface front-end element
701: mobile phone
702: laptop computer
703: desktop computer
801-805: steps for creating a user interface

DETAILED DESCRIPTION OF THE EXAMPLE EMBODIMENTS

An embodiment of the present invention discloses an industrial controller for automatically creating a user interface. The industrial controller is set in an industrial system submodule and the industrial system submodule includes a processing part, configured to collect information generated when an industrial system submodule is operating, a processing part, configured to extract an operation parameter of interest from the information generated when the industrial system submodule is operating and create a user interface for reproducing the operation parameter of interest according to the operation parameter of interest, and a communication part, configured to send the user interface to a user terminal, receive an information input from the user terminal and send the information input to the processing part.

In an embodiment of the present invention, a user interface is automatically created based on operation information of an industrial system submodule and can be used in the system, without the need to manually parse parameters or program in advance. There is no need to program the operating devices in the industrial system or to debug the programs, and, adding, replacing or upgrading an operating device in the system can be automatically adapted. This greatly increases efficiency and reduces costs. Compared with a technical solution in which a centralized central site creates a user interface and sends the user interface to an industrial system submodule, a user interface according to the present invention is automatically created by an industrial controller integrated in an industrial system submodule, which makes assembly faster, easier, and more flexible.

In an embodiment of the present invention, when the communication part receives a parameter update input from a user interface, the communicating part sends the parameter update input to the processing part and the processing part re-creates a user interface according to the parameter update input. In this way, a user may exchange data with the industrial controller through the user interface and send an updated parameter input to the industrial controller through the user interface, thereby further controlling the operating devices in the industrial system submodule.

In an embodiment of the present invention, the industrial controller further includes a storage part, which is configured to store the created user interface and is integrated in the industrial controller or an extended device of the industrial controller. A created user interface can be stored in the industrial controller or an external extended device connected to the industrial controller, for example, a hard disk. This solves the issue of insufficient storage space inside the industrial controller and extends the storage space of the industrial controller.

In an embodiment of the present invention, the user interface includes a user interface front-end element. The user interface front-end element includes at least one of a parameter display area, a parameter update input area, a control display area and a text display area.

In an embodiment of the present invention, the user interface further includes a custom configuration trigger control and a custom configuration operation interface.

In an embodiment of the present invention, when the communication part receives a custom configuration input from a user interface, the communicating part sends the custom configuration input to the processing part and the processing part re-creates a user interface according to the custom configuration input. A user is allowed to perform custom configuration for a created user interface. This realizes flexible interface creation. Different users can set an interface shape, a style and a color according to their requirements and select the modules to display and the locations where the modules are displayed. Users can customize their operation interfaces. This meets diversified and personalized requirements of users and increases work efficiency of the users.

In an embodiment of the present invention, the custom configuration input includes adding a user interface front-end element, deleting a user interface front-end element, changing the graphical shape, size, color, brightness and contrast of a user interface front-end element and moving the location of a user interface front-end element in a display area on a user interface.

In an embodiment of the present invention, the processing part of an industrial controller creates the user interface in a web-based mode, and the network script used to create the user interface includes any of HTML code, XML code, CSS code, JS code and Java code. The created user interface can be accessed and presented by any one of the following devices that are configured with a web browser: a desktop computer, a laptop computer, a tablet computer and a mobile phone. Compared with software for creating a user interface in an industrial system, the present invention automatically creates a user interface based on a universal platform of a network. A user interface can be created and configured without a dedicated configuration or development environment. Therefore, the present invention greatly reduces the costs and a user can view real-time data anywhere through a web browser and control the industrial system, without being limited by locations. This method is more flexible and convenient.

In an embodiment of the present invention, the created user interface can be accessed and presented by any one of the following devices that are configured with a web browser: a desktop computer, a laptop computer, a tablet computer and a mobile phone.

In an embodiment of the present invention, the information generated when the industrial system submodule is operating includes at least one of status information of an operating device in the industrial system submodule, a control command, a configuration parameter and its type and attribute.

An embodiment of the present invention further discloses a method for creating a user interface. The method includes acquiring, by an industrial controller integrated in an industrial system submodule, information generated when the industrial system submodule is operating, where the industrial controller is used to control operation of the industrial system submodule, extracting an operation parameter of interest from the information generated when the industrial system submodule is operating, and creating a user interface for reproducing the operation parameter of interest according to the operation parameter of interest.

In an embodiment of the present invention, a user interface is automatically created based on operation information of an industrial system submodule and can be used in the system, without the need to manually parse parameters or program in advance. There is no need to program the operating devices in the industrial system or to debug the programs, and, adding, replacing or upgrading an operating device in the system can be automatically adapted. This greatly increases efficiency and reduces costs. Compared with a technical solution in which a centralized central site creates a user interface and sends the user interface to an industrial system submodule, a user interface according to the present invention is automatically created by an industrial controller integrated in an industrial system submodule, which makes assembly faster, easier, and more flexible.

In an embodiment of the present invention, the method further includes re-creating, when a parameter update input is received from the user interface, a user interface according to the parameter update input. In this way, a user may exchange data with the industrial controller through the user interface and send an updated parameter input to the industrial controller through the user interface, thereby further controlling the operating devices in the industrial system submodule.

In an embodiment of the present invention, the user interface includes a user interface front-end element. The user interface front-end element includes at least one of a parameter display area, a parameter update input area, a control display area and a text display area.

In an embodiment of the present invention, the user interface further includes a custom configuration trigger control and a custom configuration operation interface.

In an embodiment of the present invention, the method further includes re-creating, when a custom configuration input is received from the user interface, a user interface according to the custom configuration input. A user is allowed to perform custom configuration for a created user interface. This realizes flexible interface creation. Different users can set an interface shape, a style and a color according to their requirements and select the modules to display and the locations where the modules are displayed. Users can customize their operation interfaces. This meets diversified and personalized requirements of users and increases work efficiency of the users.

In an embodiment of the present invention, the custom configuration input includes adding a user interface front-end element, deleting a user interface front-end element, changing the graphical shape, size, color, brightness and contrast of a user interface front-end element and moving the location of a user interface front-end element in a display area on a user interface.

In an embodiment of the present invention, the user interface is created in a web-based mode and the network script used to create the user interface includes any one of HTML code, XML code, CSS code, JS code and Java code. The created user interface can be accessed and presented by any one of the following devices that are configured with a web browser: a desktop computer, a laptop computer, a tablet computer and a mobile phone. Compared with software for creating a user interface in an industrial system, the present invention automatically creates a user interface based on a universal platform of a network. A user interface can be created and configured without a dedicated configuration or development environment. Therefore, the present invention greatly reduces the costs and a user can view real-time data anywhere through a web browser and control the industrial system, without being limited by locations. This method is more flexible and convenient.

In an embodiment of the present invention, the created user interface can be accessed and presented by any one of the following devices that are configured with a web browser: a desktop computer, a laptop computer, a tablet computer and a mobile phone.

In an embodiment of the present invention, the information generated when the industrial system submodule is operating includes at least one of status information of an operating device in the industrial system submodule, a control command, a configuration parameter and its type and attribute.

An embodiment of the present invention further discloses a non-transient machine readable medium. The machine readable medium is used to store a machine readable instruction used to generate a user interface and, when the machine readable instruction is executed by an industrial controller, the industrial controller executes and implements the function of any one of the embodiments.

In order to make the technical features, objectives and effects of the present invention more comprehensible, embodiments of the present invention are described with reference to the accompanying drawings. Symbol numbers in the figures indicate different parts. For multiple same components, sometimes, only one is marked and others are omitted.

The figures discussed below and embodiments used to describe the principle disclosed in this patent document are used for illustration only and should in no case be interpreted as limitations to the scope of the present invention. Persons skilled in the art will understand that the principle can be implemented in any device that is appropriately arranged.

Various innovative instructions of the patent application will be described with reference to exemplary and non-restrictive embodiments.

Figure 2:
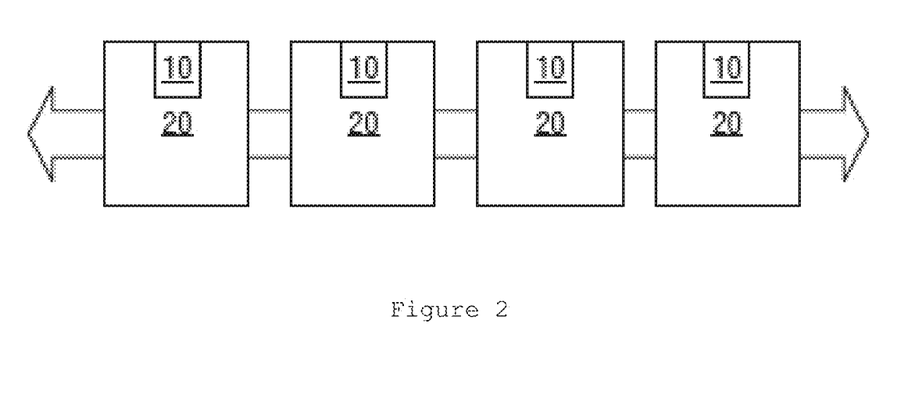
FIG. 2 schematically shows architecture of an industrial system according to an embodiment of the present invention.

As shown in FIG. 2, there are multiple operating devices 20 and industrial controllers 10 controlling the operating devices 20 in an industrial system. One operating device 20 and one industrial controller 10 controlling the operating device 20 form an industrial system submodule. Each industrial system submodule is in an independent modular structure and is operating automatically. It is mutually independent of other industrial system submodules. Industrial system submodules can be connected to each other through an industrial Ethernet or other communication modes to form a communication network. An operating device 20 in an industrial system submodule generally has a user interface 200. The user interface 200 may be a Human Machine Interface (HMI) used to execute a human-computer interaction, for example, receive a configuration parameter and a control command input by a user for an operating device 20 and provide a user with operating status of operating devices 20 in the system so that the user can monitor the devices.

An operating device 20 may be a motor, a conveyor, a sensor, a switch, an intelligent relay or an intelligent controller in an industrial system. An industrial controller 10 may be a Programmable Logical Controller (PLC), a Programmable Automation Controller (PAC), a bus industrial computer or an embedded controller.

Different from FIG. 1, in an embodiment of the present invention, a user interface 200 is not created by a centralized central site 1 but by an industrial controller 10 set in an industrial system submodule. Each industrial system submodule is operating automatically, and the relatively independent modular structure makes assembly faster, easier and more flexible. Creating or updating the user interface of each industrial system submodule is not affected by other modules. This ensures that industrial system submodules are operating independently and stably.

Figure 3:
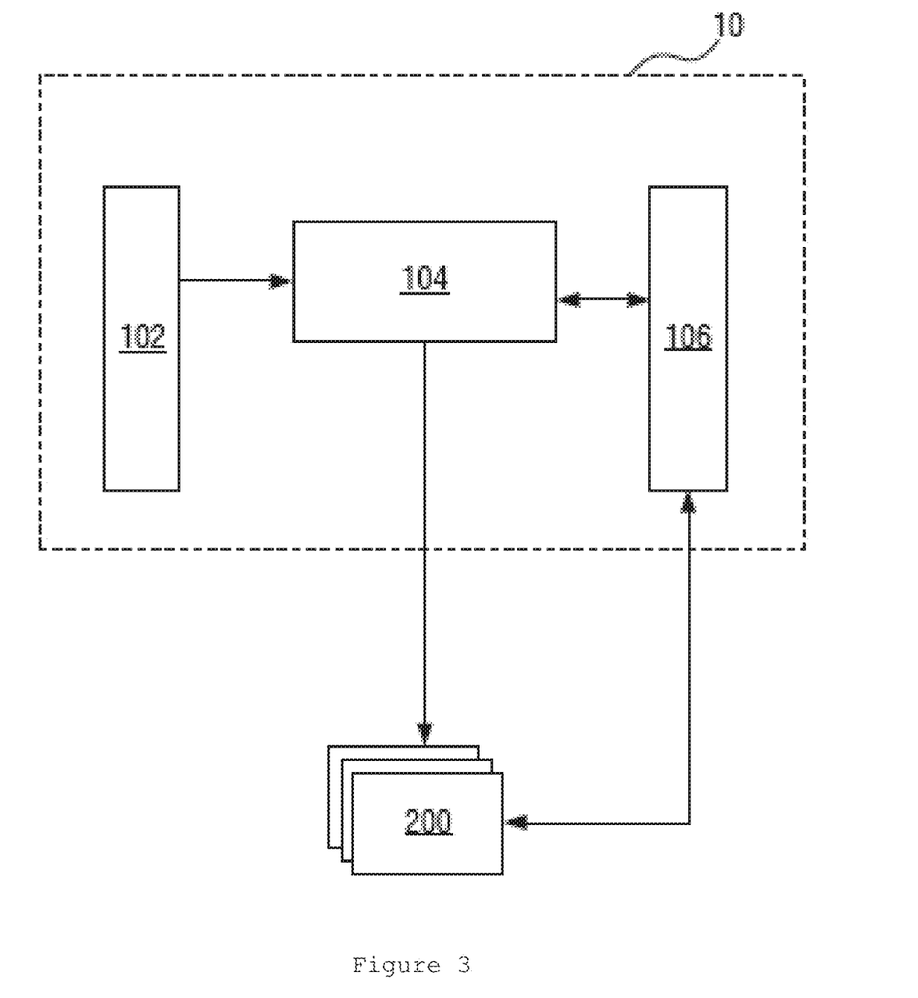
FIG. 3 schematically shows an industrial controller for automatically creating a user interface according to an embodiment of the present invention.

FIG. 3 schematically shows an industrial controller 10 for automatically creating a user interface 200 according to an embodiment of the present invention. The industrial controller 10 has a collecting part 102, which is configured to collect information generated when the industrial system submodule of the industrial controller 10 is operating. The information generated when the industrial system submodule is operating includes at least one of status information of the operating device 20, a control command, a configuration parameter and its type in the industrial system submodule. The status of the operating device 20 in the industrial system submodule may be, for example, ON/OFF state, temperature curve of a motor or operating status of the motor. A control command may be, for example, a command for starting, decelerating, stopping, turning on or turning off a motor. A configuration parameter may be an activity, for example, setting temperature and pressure, start, stop, examining a sensor reading and setting a brake value. A configuration parameter type may be an integer, a string, a long integer, a floating point number or Boolean. Information of an industrial system submodule may be expressed using a descriptive language, for example, an interface document recorded using a control code.

The industrial controller 10 stores resources and data, for example, a user interface front-end element and a user interface back-end service program. The user interface back-end service program is used to respond to an information input from a user interface and complete a corresponding operation according to the request of the user input. The user interface front-end element is associated with the operation parameter and is used to reproduce a web front-end. The collecting part 102 of the industrial controller 10 collects information generated when its industrial system submodule is operating and sends the collected information to the processing part 104 in the industrial controller 10. After receiving the information generated when the industrial system submodule is operating, the processing part 104 in the industrial controller 10 parses the information of interest into an operation parameter which can be recognized by the processing part 104. After extracting the operation parameter of interest, the processing part 104 sends the operation parameter to the user interface back-end service program. After receiving the operation parameter, the user interface back-end service program presents the operation parameter on the user interface. Meanwhile, the processing part 104 queries in the user interface front-end element library stored in the industrial controller 10 according to the extracted operation parameter and extracts a user interface front-end element, which is used to create the user interface 200 for reproducing the operation parameter of interest.

The communication part 106 of the industrial controller 10 is configured to send the user interface 200 to a user terminal and receive an information input from the user terminal for data exchange. If a parameter update input is received from a user interface, the parameter update input is sent to the user interface back-end service program. The processing part 104 creates a new user interface according to the updated parameter.

Figure 4:
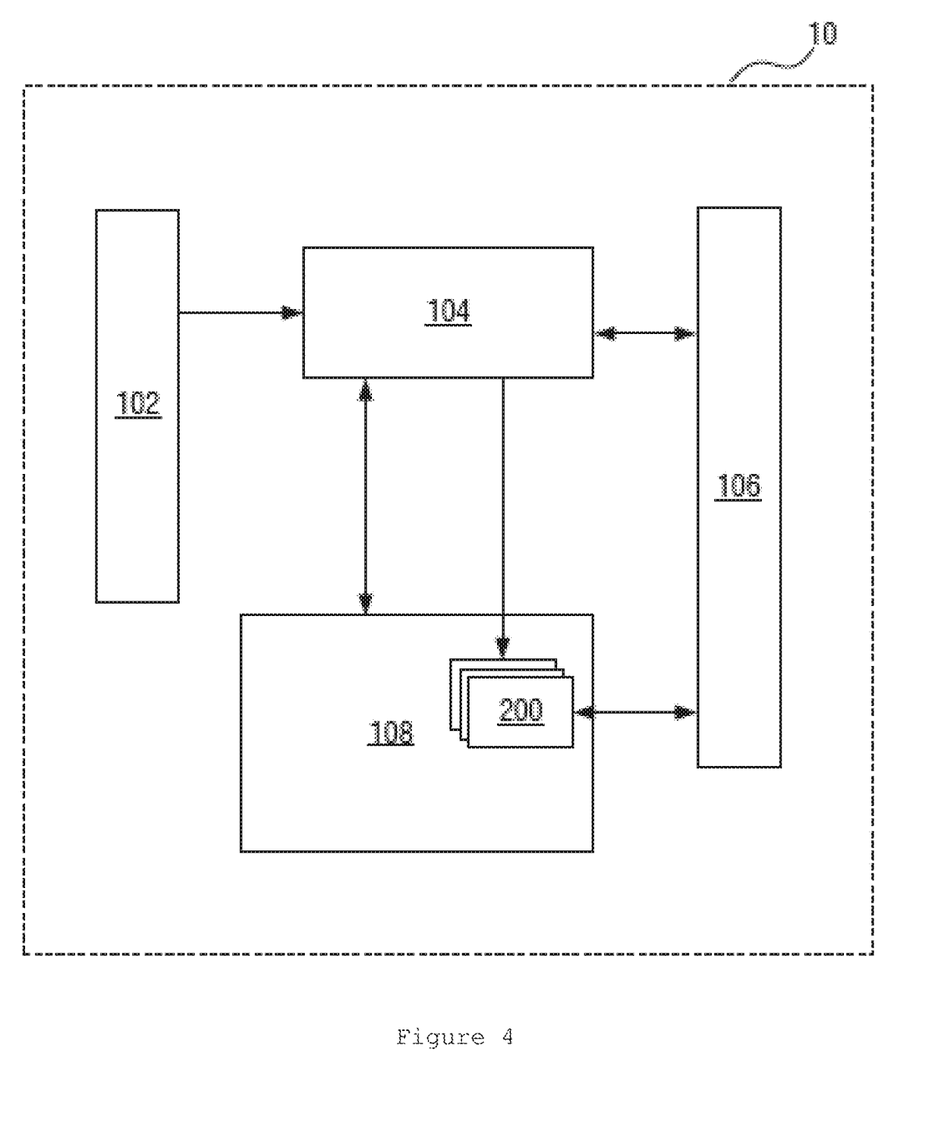
FIG. 4 schematically shows an industrial controller for automatically creating a user interface according to another embodiment of the present invention.

FIG. 4 schematically shows an industrial controller for creating a user interface according to another embodiment of the present invention. The user interface 200 created by the processing part 104 may be stored in a storage part 108. The storage part 108 may be integrated in the industrial controller 10 or may be integrated in an extended device of the industrial controller 10, for example, a hard disk connected to the industrial controller.

Figure 5:
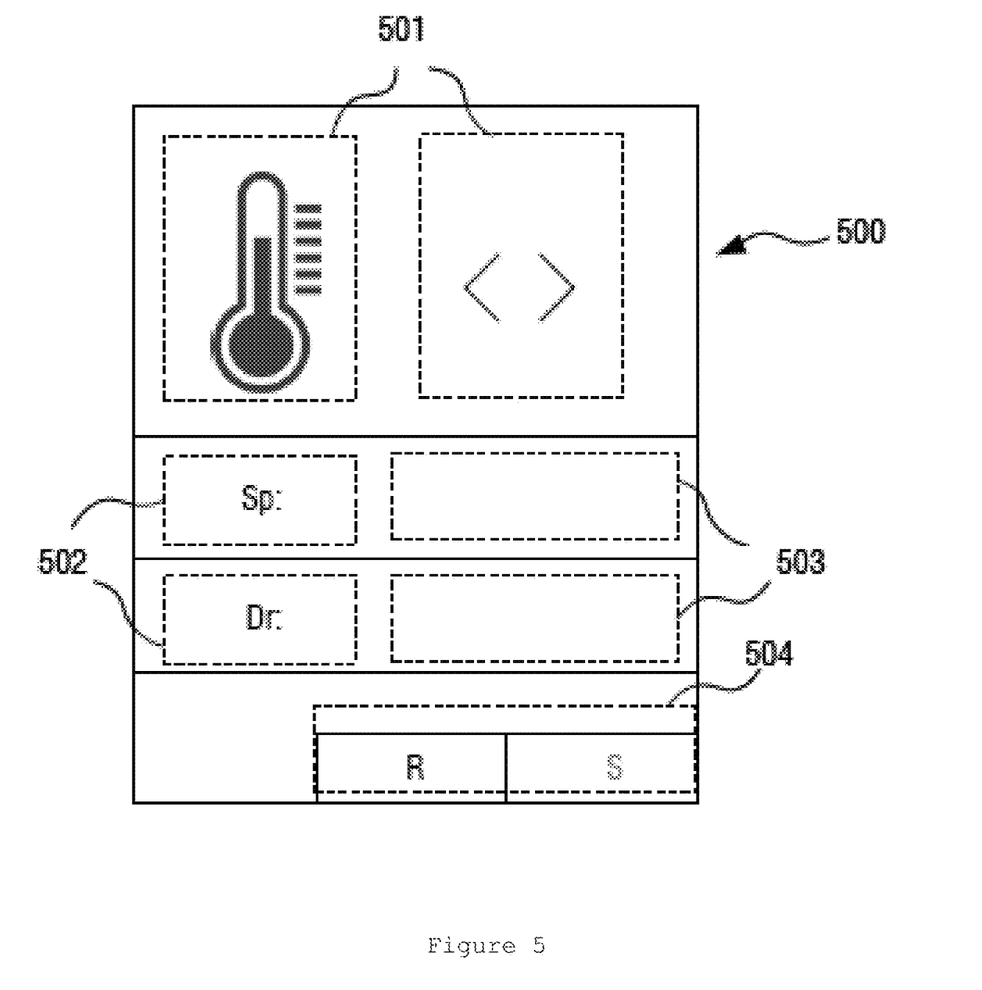
FIG. 5 schematically shows a front-end display interface of a user interface according to an embodiment of the present invention.

FIG. 5 schematically shows a front-end display interface of a user interface according to an embodiment of the present invention. Specifically, FIG. 5 shows a monitoring interface represented on the front-end of the user interface. On the user interface, the front-end display 500 can provide a graphical control display area 501, a text display area 502, a parameter display area 503 and a custom configuration control display area 504. The control graph in the graphical control display area 501 and the prompt text in the text display area 502 are respectively associated with the type and value of the operation parameter received by the processing part 104.

Specifically, take a conveyor control system in a production line of a factory for example. An industrial system submodule includes an industrial controller (for example, a PLC) and an operating device (for example, a conveyor) controlled by the industrial controller (for example, a PLC). Operation parameters such as start, stop, speed, direction and tilt when the operating device (for example, a conveyor) is operating can be monitored and controlled through a user interface created by the industrial controller (for example, a PLC). The speed and tilt variables are variables of the floating-point number type and have certain ranges. The start, stop and direction variables are Boolean variables and cover only two circumstances. Parameter information generated when a conveyor is operating is described using an industrial system control code. If the speed and direction of the conveyor are operation parameters in which a user is interested, the processing part 104 extracts a related control code recording the speed and direction operation parameters of the conveyor, parses the control code and sends parsed operation parameters (for example, the running speed of the conveyor is 1.5 m/s and the direction is "left") to the user interface back-end service program. After receiving the operation parameters, the user interface back-end service program presents the operation parameters on the user interface. Meanwhile, the processing part 104 queries in the user interface front-end element library stored in the industrial controller 10 according to status information (speed and direction of the conveyor) indicated by the extracted operation parameters and extracts user interface front-end elements corresponding to the speed and direction of the conveyor. The industrial controller 10 stores a graphic control and prompt text corresponding to operation parameters, for example, a thermometer graph and prompt text "Sp" are associated with the speed parameter of a conveyor and the graphs and prompt text "Dr" of the left and right keys are associated with the direction parameter of a conveyor. After extracting the corresponding graphical control and prompt text, the processing part 104 presents the elements in the front-end of the user interface and automatically creates a user interface. On the user interface shown in FIG. 5, the parameter display area 503 is set adjacent to the text display area 502, and the value of the conveyor running speed parameter "1.5 m/s" is presented in the parameter display area 503 and is adjacent to prompt text "Sp".

If a user hopes to monitor the tilt rather than the speed of a conveyor, the user may change the setting of the "Conveyor speed" parameter to "Conveyor tilt" at the front-end of the user interface. The communication part 106 of the industrial controller 10 can receive an information input from the front-end of the user interface and send the parameter update input to the processing part 104. When the processing part 104 receives an update input for an operation device configuration parameter from the user, the processing part 104 sends the parameter update input to the back-end service program of the user interface, and the user interface back-end program responds by adjusting a corresponding parameter and the processing part 104 creates a new user interface according to the updated parameter configuration, that is, presenting the value of the "Conveyor tilt" parameter and the user interface front-end element related to the "Conveyor tilt" parameter on the updated user interface.

The user interface 500 further provides a custom configuration control display area 504, as shown in FIG. 5. In a custom configuration control (R, S), S indicates a custom configuration trigger control and R indicates a trigger control for returning to a monitoring interface after custom configuration ends. When a user presses the control button S, a custom configuration request is triggered. After receiving a custom configuration interface request from the user, the communication part 106 in the industrial controller 10 sends the request to the processing part 104. The processing part 104 re-creates a user interface according to the custom configuration input of the user. The custom configuration process is specifically described below.

Figure 6:
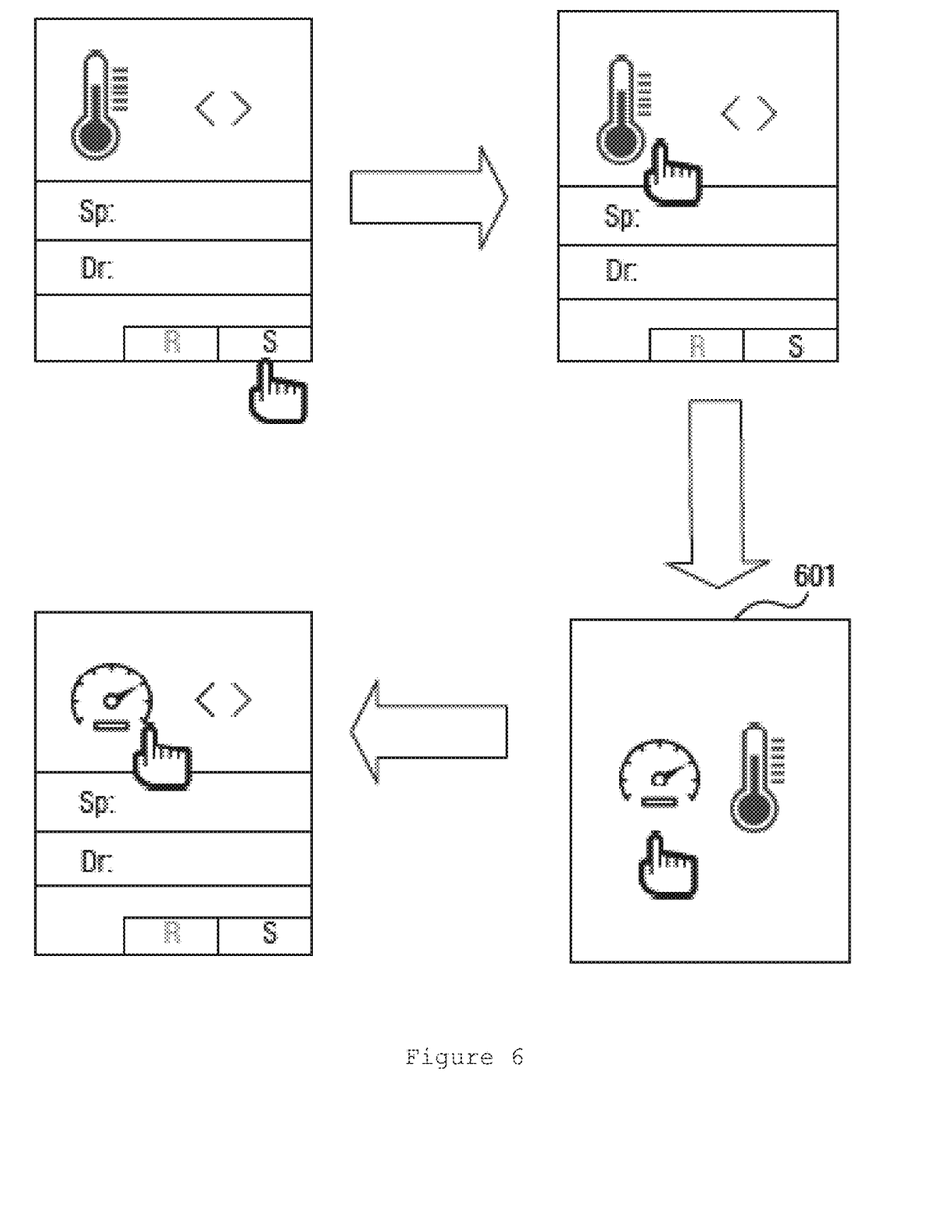
FIG. 6 schematically shows a process of customizing a user interface according to an embodiment of the present invention.

FIG. 6 schematically shows a process of customizing a user interface according to an embodiment of the present invention. In an example shown in FIG. 5, only a monitoring page is shown on the user interface. In addition to providing a monitoring page, a user interface according to the present invention presents a custom configuration page to a user. A user can customize the layout of a created user interface, for example, a user can add extra functional keys on the basis of original web elements of the user interface to add custom functions. The user can also add or delete the user interface front-end element according to preferences and needs, change the graphical shape, size, color and brightness of the user interface front-end element, move the location of the user interface front-end element in the display area of the user interface and combine a layout required by the user. The web front-end element can be set and displayed in any location of the display area. In addition, features such as the size, shape, direction, color and embedded text of the web front-end element can be edited. After receiving configuration update information from a user, the communication part 106 in the industrial controller 10 sends the configuration update information to the processing part 104. The processing part 104 associates the web front-end element with the web back-end program. As shown in FIG. 6, to re-configure and re-create a monitoring interface for a conveyor control system, a user first presses the control button S to trigger a user custom configuration request. After receiving the custom interface configuration request from the user, the communication part 106 in the industrial controller 10 sends the request to the processing part 104. The processing part 104 presents an interface that includes the user interface front-end element library 601 to the interface front-end. The root user may drag a required control graph from the user interface front-end element library 601 to an appropriate location on the screen. For example, a float-type control is used to replace the thermometer control in the original user interface. After receiving the element replacement information, the processing part 104 again stores and presents a user interface front-end element selected by the user, and at the same time sends the element replacement information to the user interface back-end service program. The user interface back-end service program adjusts a corresponding configuration according to the input and the processing part 104 creates a new user interface according to the custom configuration. When a user presses the button R, the processing part 104 ends its custom configuration process and makes the user interface front-end return to display of the monitoring interface.

Figure 7:
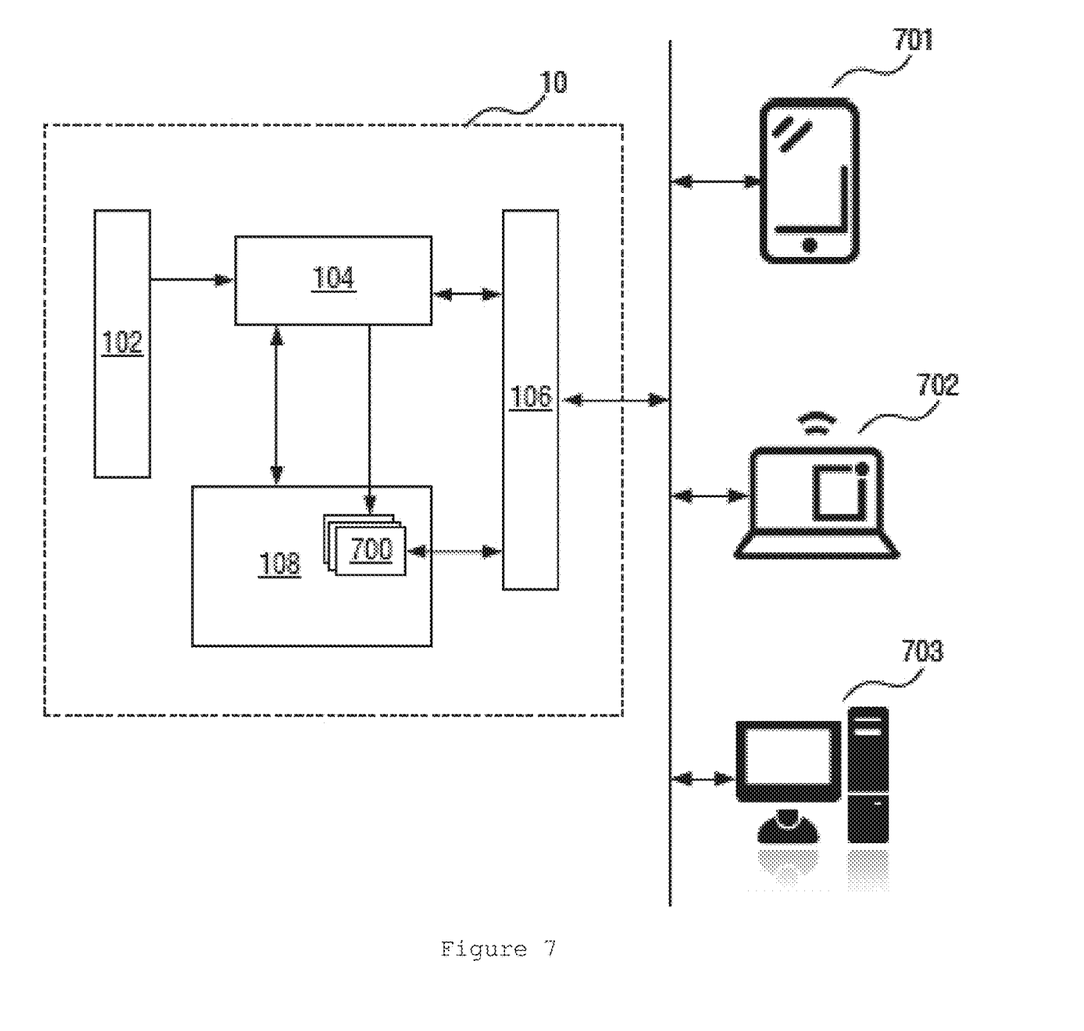
FIG. 7 schematically shows an industrial controller for automatically creating a user interface according to another embodiment of the present invention.

FIG. 7 schematically shows an industrial controller for creating a user interface according to another embodiment of the present invention. The processing part 104 creates the user interface 700 in a web-based mode. The industrial controller 10 can create a user interface 700 with a graphical control by using a corresponding web architecture and a communication protocol. The user interface 700 that is created in a web-based mode may be based on HTML code, XML code, CSS code, JS code, Java code or other web-based scripts.

As shown in FIG. 7, a user device can be connected to the industrial controller 10 through the communication part 106 (for example, wireless network WiFi). The user device here may be a desktop computer, a laptop computer, a tablet computer, a mobile phone or any terminal device that can access a network through a web browser.

Different from the prior art, no client software needs to be installed on a user device. On the contrary, a user can make an access request to the industrial controller 10 through a web browser on the user device. For example, a user only needs to enter a Uniform Resource Locator (URL) in the address bar of the web browser to send an access request for obtaining a programming service. After receiving the request, the industrial controller 10 sends the user interface 700 to the user device in response to the request and presents the user interface on the display of the user device. A user can access the user interface 700 where industrial system information is presented through a device, for example, a mobile phone and a computer, enabling remote monitoring without being limited by locations, hence it is convenient and flexible.

Figure 8:
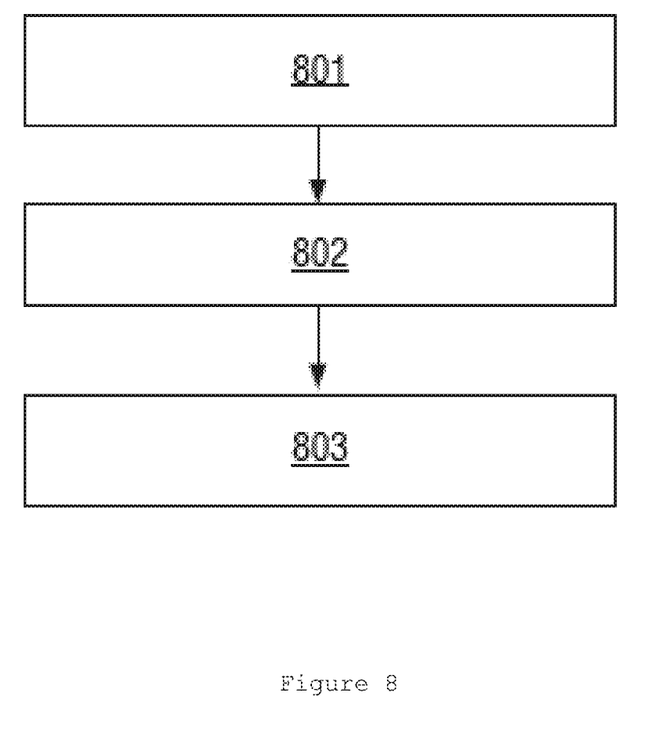
FIG. 8 schematically shows a flow chart of a method for creating a user interface according to an embodiment of the present invention.

FIG. 8 schematically shows a flow chart of a method for creating a user interface according to an embodiment of the present invention. The method includes a step 801: acquire, by an industrial controller integrated in an industrial system submodule, information generated when the industrial system submodule is operating, where the industrial controller is used to control operation of the industrial system submodule; a step 802: extract an operation parameter of interest from the information generated when the industrial system submodule is operating; and a step 803: create a user interface for reproducing the operation parameter of interest according to the extracted operation parameter of interest.

The method further includes a step 804: re-create, when a parameter update input is received from the user interface, a user interface according to the parameter update input.

The method further includes a step 805: re-create, when a custom configuration input is received from the user interface, a user interface according to the custom configuration input.

An embodiment of the present invention further discloses a non-transient machine readable medium, which is used to store an instruction for executing an embodiment of the method for creating a user interface by a machine, as described in this document. Specifically, a system or apparatus that is equipped with a storage medium can be provided. The storage medium stores a software program code that implements the function of any one of the embodiments and an industrial controller (CPU or MPU) of the system or apparatus reads and executes the program code stored in the storage medium.

In this circumstance, the program code read from the storage medium can implement the function of any one of the embodiments. Therefore, the program code and storage medium that stores the program code constitute a part of the present invention.

The storage medium that is used to provide a program code may be a floppy disk, a hard disk, a magneto-optical disk, a CD (for example, CD-ROM, CD-R, CD-RW, DVD-ROM, DVD-RAM, DVD-RW and DVD+RW[z1]), a tape, a non-volatile memory card or a ROM[z2]. Optionally, a program code can be downloaded from a server computer through a communication network.

In addition, it should be clear that a user can implement the function of any one of the embodiments by executing a program code read by an industrial controller or by making an operating system running on the industrial controller to complete some or all actual operations through an instruction based on the program code.

It is understandable that, after a program code read by a storage medium is written to a memory that is set in an expansion module inserted in an industrial controller or written to a memory that is set in an expansion unit connected to an industrial controller, an instruction based on the program code makes a CPU on the expansion module or expansion unit execute part or all actual operations, so as to implement the function in any one of the embodiments.

It should be noted that, although several units or apparatuses of a device are described in detail in the foregoing, the division is not compulsory. In fact, according to embodiments of the present invention, features and functions of two or more apparatuses described in the foregoing may be embodied in one unit or apparatus. On the contrary, features and functions of one apparatus described in the foregoing may be further embodied by more units or apparatuses.

In addition, although operations of the disclosed method are described in a specific sequence in the accompanying drawings, this does not require or imply the operations must be executed according to the specific sequence or all the operations must be executed to achieve expected results. On the contrary, execution sequences of steps described in flow charts may be changed. Additionally or alternatively, some steps may be omitted, multiple steps may be combined into one step and/or one step may be broken down into multiple steps for execution.

It should be noted that embodiments of the present invention may be implemented through hardware, software or a combination of software and hardware. Hardware can be implemented through a dedicated logic; software can be stored in a memory and is executed by an appropriate instruction execution system, for example, a microprocessor or dedicated design hardware. Persons skilled in the art may understand that the device and method may be implemented using a computer executable instruction and/or a control code included in a controller, for example, a storage medium such as a magnetic disk, a CD or DVD-ROM, a programmable memory such as a read-only memory (firmware) or a data carrier such as an optical or electronic signal carrier provides such a code. The device disclosed in embodiments of the present invention and its apparatuses may be implemented by a very large scale integrated circuit or gate array, a semiconductor such as a logical chip and a transistor, a hardware circuit of a programmable hardware device such as a field programmable gate array and a programmable logic device, software executed by processors of various types, or a combination of the hardware circuit and software, for example, firmware.

In this document, "schematically" indicates that "an instance, an example or an illustration is used" and any "schematic" representations and implementation modes described in this document should not be interpreted as a preferred or superior technical solution.

The detailed descriptions listed in the foregoing are specific descriptions of feasible embodiments of the present invention. The descriptions are not limitations to the protection scope of the present invention. Any equivalent embodiments or modifications made within the spirit of the present invention are all included in the protection scope of the present invention.

The invention claimed is:

1. An industrial controller for automatically creating a user interface, the industrial controller being configured to be set in an industrial system submodule, the industrial controller comprising:
   a collecting part, configured to collect information generated when the industrial system submodule is operating;
   a processing part, configured to extract an operation parameter of interest from the information generated when the industrial system submodule is operating and create a user interface for reproducing the operation parameter of interest according to the operation parameter of interest extracted, the user interface including a custom configuration trigger control and a custom configuration operation interface; and
   a communication part, configured to send the user interface to at least one user terminal, receive an information input from the at least one user terminal and send the information input to the processing part, wherein when the communication part receives a parameter update input from the user interface, the communication part sends the custom configuration input to the processing part and the processing part re-creates a user interface according to the custom configuration input.

2. The industrial controller of claim 1, wherein, upon the communicating part receiving a parameter update input from the user interface, the communication part is configured to send the parameter update input to the processing part and the processing part is configured to re-create a user interface according to the parameter update input.

3. The industrial controller of claim 1, further comprising a storage part, wherein the storage part is configured to store the user interface created and wherein the storage part is integrated in the industrial controller or is integrated in an extended device of the industrial controller.

4. The industrial controller of claim 1, wherein the user interface comprises a user interface front-end element, wherein the user interface front-end element includes at least one of a parameter display area, a parameter update input area, a control display area and a text display area.

5. The industrial controller of claim 1, wherein, upon the communicating part receiving a custom configuration input from the user interface, the communication part is configured to send the custom configuration input to the processing part and the processing part is configured to re-create a user interface according to the custom configuration input.

6. The industrial controller of claim 5, wherein the custom configuration input includes one or more of the following:
adding a user interface front-end element;
deleting a user interface front-end element;
changing graphical shape, size, color, brightness and contrast of a user interface front-end element; and
moving a location of a user interface front-end element in a display area on a user interface.

7. The industrial controller of claim 1, wherein the processing part is configured to create a user interface in a web-based mode, wherein a network script used to generate the user interface comprises one of:
HTML code, XML code, CSS code, JS code and Java code.

8. The industrial controller of claim 7, wherein the user interface created is configured to be accessed and presented by one of the following, configured with a web browser: a desktop computer, a laptop computer, a tablet computer and a mobile phone.

9. The industrial controller of claim 1, wherein the information generated by the industrial system submodule when the industrial system submodule is operating comprises:
at least one of status information of an operating device in the industrial system submodule, a control command, a configuration parameter and a type and attribute.

10. The industrial controller of claim 2, further comprising a storage part, wherein the storage part is configured to store the user interface created and wherein the storage part is integrated in the industrial controller or is integrated in an extended device of the industrial controller.

11. The industrial controller of claim 3, wherein the user interface comprises a user interface front-end element, wherein the user interface front-end element includes at least one of a parameter display area, a parameter update input area, a control display area and a text display area.

12. The industrial controller of claim 11, wherein the user interface further comprises a custom configuration trigger control and a custom configuration operation interface.

13. A method for creating a user interface, the method comprising:
acquiring, by an industrial controller integrated in an industrial system submodule, information generated when the industrial system submodule is operating, wherein the industrial controller is usable to control the operation of the industrial system submodule;
extracting an operation parameter of interest from the information generated when the industrial system submodule is operating;
creating a user interface for reproducing the operation parameter of interest according to the operation parameter of interest; and
recreating a user interface according to a custom configuration input upon receiving a parameter update input from a user interface.

14. The method for creating a user interface of claim 13, further comprising:
re-creating, upon a parameter update input being received from a user interface, a user interface according to the parameter update input.

15. The method for creating a user interface of claim 13, wherein the user interface includes a user interface front-end element, the user interface front-end element including:
at least one of a parameter display area, a parameter update input area, a control display area and a text display area.

16. The method for creating a user interface of claim 15, wherein the user interface further includes a custom configuration trigger control and a custom configuration operation interface.

17. The method for creating a user interface of claim 13, further comprising:
re-creating, upon a custom configuration input being received from a user interface, a user interface according to the custom configuration input.

18. The method for creating a user interface of claim 17, wherein the custom configuration input comprises one or more of the following:
adding a user interface front-end element;
deleting a user interface front-end element;
changing a graphical shape, size, color, brightness and contrast of a user interface front-end element; and
moving a location of a user interface front-end element in a display area on a user interface.

19. The method for creating a user interface of claim 13, wherein the user interface is created in a web-based mode, and wherein a network script used to generate the user interface comprises one of:
HTML code, XML code, CSS code, JS code and Java code.

20. The method for creating a user interface of claim 19, wherein the user interface created is accessable and presentable by one of, configured with a web browser: a desktop computer, a laptop computer, a tablet computer and a mobile phone.

21. The method for creating a user interface of claim 13, wherein the information generated by the industrial system submodule when the industrial system submodule is operating comprises:
at least one of status information of an operating device in the industrial system submodule, a control command, a configuration parameter and a type and attribute.

22. A non-transitory machine readable medium, storing machine readable instructions usable to create a user interface, wherein, upon the machine readable instructions being executed by an industrial controller, the industrial controller is configured to execute
acquiring, by an industrial controller integrated in an industrial system submodule, information generated when the industrial system submodule is operating, wherein the industrial controller is usable to control the operation of the industrial system submodule;

extracting an operation parameter of interest from the information generated when the industrial system submodule is operating;

creating a user interface for reproducing the operation parameter of interest according to the operation parameter of interest; and recreating a user interface according to a custom configuration input upon receiving a parameter update input from a user interface.

\* \* \* \* \*